(12) United States Patent
Yamashita (10) Patent No.: US 9,751,366 B2
(45) Date of Patent: Sep. 5, 2017

(54) PNEUMATIC TIRE

(71) Applicant: TOYO TIRE & RUBBER CO., LTD., Osaka-shi, Osaka (JP)

(72) Inventor: Kenichi Yamashita, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 125 days.

(21) Appl. No.: 14/058,491

(22) Filed: Oct. 21, 2013

(65) Prior Publication Data

US 2014/0150944 A1 Jun. 5, 2014

(30) Foreign Application Priority Data

Dec. 3, 2012 (JP) ................................ 2012-264380

(51) Int. Cl.
*B60C 11/00* (2006.01)
*B60C 11/03* (2006.01)
*B60C 11/13* (2006.01)

(52) U.S. Cl.
CPC ........ *B60C 11/1346* (2013.04); *B60C 11/005* (2013.01); *B60C 11/0058* (2013.04); *B60C 2011/0025* (2013.04)

(58) Field of Classification Search
CPC ............... B60C 11/005; B60C 11/0058; B60C 11/0075; B60C 11/1346
See application file for complete search history.

(56) References Cited

U.S. PATENT DOCUMENTS

| | | | | |
|---|---|---|---|---|
| 4,381,810 A | * | 5/1983 | Cady et al. | 152/209.5 |
| 4,385,653 A | * | 5/1983 | Okazaki et al. | 152/209.5 |
| 5,226,987 A | * | 7/1993 | Matsumoto et al. | 152/209.5 |
| 2007/0017617 A1 | * | 1/2007 | Lafrique | B60C 1/0016 |
| | | | | 152/209.5 |

FOREIGN PATENT DOCUMENTS

| | | | |
|---|---|---|---|
| DE | 1480962 | * | 6/1969 |
| JP | 04-50004 A | | 2/1992 |
| JP | 04-218405 A | | 8/1992 |
| JP | 2004-284453 | * | 10/2004 |
| JP | 2009-107435 A | | 5/2009 |
| JP | 2009-154791 A | | 7/2009 |
| WO | WO2009/057587 | * | 5/2009 |

(Continued)

OTHER PUBLICATIONS

English machine translation of DE1480962, dated Jun. 1969.*

(Continued)

*Primary Examiner* — Robert Dye
(74) *Attorney, Agent, or Firm* — Westerman, Hattori, Daniels & Adrian, LLP (57) ABSTRACT

The invention provides a pneumatic tire which can reduce a rolling resistance while maintaining an wear resistance. Among a cap portion in a center area, at least the cap portion of a center land portion is provided with a cap front layer which includes a surface, and a cap inner layer which is laminated in an inner periphery of the cap front layer. A loss tangent of the cap front layer is set to be smaller than a loss tangent of the cap inner layer and be smaller than a loss tangent of the cap portions in the shoulder areas.

5 Claims, 8 Drawing Sheets

(56) References Cited

FOREIGN PATENT DOCUMENTS

WO      WO2010/371143      * 12/2010

OTHER PUBLICATIONS

English machine translation of JP2004-284453, dated Oct. 2004.*
English machine translation of JP2009-154791, Jul. 2009.*
English machine translation of WO2009/057587, dated May 2009.*
English machine translation of WO2010/371143, dated Dec. 2010.*
Office Action dated Nov. 2, 2015, issued in counterpart Chinese Patent Application No. 201310455483.X, with English translation. (14 pages).
Office Action dated May 18, 2016, issued in counterpart Chinese Patent Application No. 201310455483.X, with English translation. (18 pages).
Office Action dated Aug. 3, 2016, issued in counterpart Japanese Patent Application No. 2012-264380, with English translation. (6 pages).
Office Action dated Nov. 16, 2016, issued in Chinese Patent Application No. 201310455483.X, with English translation. (16 pages).

* cited by examiner

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|---|---|---|---|---|---|
| NUMBER OF MAIN GROOVES | 3 | 3 | 3 | 3 | 3 | 3 | 4 | 4 | 3 | 4 | 3 | 3 | 4 |
| MULTILAYER FORMATION OF CAP PORTION | Ce LAND PORTION | Ce LAND PORTION | Ce LAND PORTION | Ce LAND PORTION | Ce LAND PORTION | Ce LAND PORTION | Ce LAND PORTION AND Me LAND PORTION | ONLY Ce LAND PORTION | NO | NO | NO | Ce AREA AND Sh AREA (WHOLE) | Ce AREA AND Sh AREA (WHOLE) |
| tanδ1/tanδ2 (%) | 57 | 57 | 57 | 57 | 57 | 57 | 57 | 57 | — | — | — | 57 | 57 |
| tanδ1 | 0.04 | 0.04 | 0.04 | 0.04 | 0.04 | 0.04 | 0.04 | 0.04 | — | — | 0.04 | 0.04 | 0.04 |
| tanδ2 | 0.07 | 0.07 | 0.07 | 0.07 | 0.07 | 0.07 | 0.07 | 0.07 | 0.07 | 0.07 | — | 0.07 | 0.07 |
| D1/D2 (%) | 30 | 15 | 45 | 30 | 30 | 30 | 30 | 30 | — | — | — | 30 | 30 |
| GROOVE WALL PORTION | NO | NO | NO | YES | YES | YES | NO | NO | NO | NO | NO | NO | NO |
| ROLLING RESISTANCE | 92 | 95 | 91 | 91 | 90 | 89 | 90 | 94 | 100 | 97 | 85 | 90 | 88 |
| WEAR RESISTANCE | 96 | 97 | 94 | 96 | 96 | 96 | 92 | 95 | 100 | 97 | 75 | 87 | 84 |

PNEUMATIC TIRE

BACKGROUND OF THE INVENTION

Field of the Invention

The present invention relates to a pneumatic tire in which a plurality of main grooves extending along a tire peripheral direction are provided in a tread rubber.

Description of the Related Art

Conventionally, as a pneumatic tire, there has been known a pneumatic tire in which a plurality of main grooves extending along a tire peripheral direction are provided in a tread rubber. In the pneumatic tire mentioned above, a center land portion is arranged in a center portion in a tire width direction, and a cap portion constructing an outer layer of the center land portion is multilayered by a front layer and an inner layer (for example, JP-A-4-50004)

In the pneumatic tire according to JP-A-4-50004, since a loss tangent (=loss elastic modulus/storage elastic modulus, which may be called as "tan δ") of the front layer of the cap portion is set to be larger than a loss tangent of the inner layer of the cap portion, the pneumatic tire is excellent in an wear resistance. However, the pneumatic tire mentioned above has a problem that a rolling resistance is enlarged.

SUMMARY OF THE INVENTION

Accordingly, the present invention is made by taking the circumstances into consideration, and an object of the present invention is to provide a pneumatic tire which can reduce a rolling resistance while maintaining an wear resistance.

According to the present invention, there is provided a pneumatic tire, which includes:

a tread rubber; and a plurality of main grooves extending along a tire peripheral direction and provided in the tread rubber, wherein the tread rubber has a center area which is arranged between a pair of outer main grooves arranged in an outermost side in a tire width direction, and a pair of shoulder areas which are arranged in outer sides in the tire width direction of the outer main groove, wherein the center area has a center land portion which is zoned by the main groove and is positioned in a center portion in the tire width direction, wherein the tread rubber has a cap portion which constructs an outer layer, and a base portion which is laminated in an inner periphery of the cap portion and constructs an inner layer, wherein at least the cap portion of the center land portion among the cap portion in the center area has a cap front layer which includes a surface, and a cap inner layer which is laminated in an inner periphery of the cap front layer, and wherein a loss tangent of the cap front layer is set to be smaller than a loss tangent of the cap inner layer and be smaller than a loss tangent of the cap portions in the shoulder areas.

On the basis of the pneumatic tire according to the present invention, in the cap portion of at least the center land portion in the cap portion of the center area, the loss tangent of the cap front layer is set to be smaller than the loss tangent of the cap inner layer, and is set to be smaller than the loss tangent of the layer which includes the surface of the cap portion in the shoulder area. As a result, since the rubber having the smaller loss tangent is arranged in the cap front layer which is the portion having a larger energy loss, a rolling resistance is reduced.

Further, since the rubber having the larger loss tangent is arranged in each of the cap inner layer which is laminated in the inner periphery of the cap front layer, and the layer which includes the surface of the shoulder area affecting the wear resistance, the wear resistance is maintained. As mentioned above, on the basis of the pneumatic tire according to the present invention, it is possible to reduce the rolling resistance while maintaining the wear resistance.

Also, the pneumatic tire according to the present invention may have a configuration in which:

the cap front layer has a surface portion which is arranged along the surface of the cap portion.

According to the structure mentioned above, since the surface portion of the cap front layer is arranged along the surface of the cap portion, the rubber having the smaller loss tangent is arranged in the portion having the larger energy loss. As a result, it is possible to securely reduce the rolling resistance.

Also, the pneumatic tire according to the present invention may have a configuration in which:

a thickness of the surface portion is set to be less than one third a depth of the main groove.

According to the structure mentioned above, since the thickness of the surface portion is set to be less than one third the depth of the main groove, the cap inner layer having the larger loss tangent supports the cap front layer. As a result, it is possible to further securely maintain the wear resistance.

Also, the pneumatic tire according to the present invention may have a configuration in which:

the cap front layer further comprises a groove wall portion which is arranged so as to extend along a wall portion of the main groove from the surface portion.

According to the structure mentioned above, since the groove wall portion of the cap front layer is arranged so as to extend along the wall portion of the main groove from the surface portion, the rubber having the smaller loss tangent is arranged in the other deforming portion than the surface. As a result, it is possible to further reduce the rolling resistance.

As mentioned above, the pneumatic tire according to the present invention achieves an excellent effect that it is possible to reduce the rolling resistance while maintaining the wear resistance.

DETAILED DESCRIPTION OF THE PREFERRED EMBODIMENTS

A description will be given below of an embodiment in a pneumatic tire according to the present invention with reference to FIGS. 1 and 2.

Figure 1:
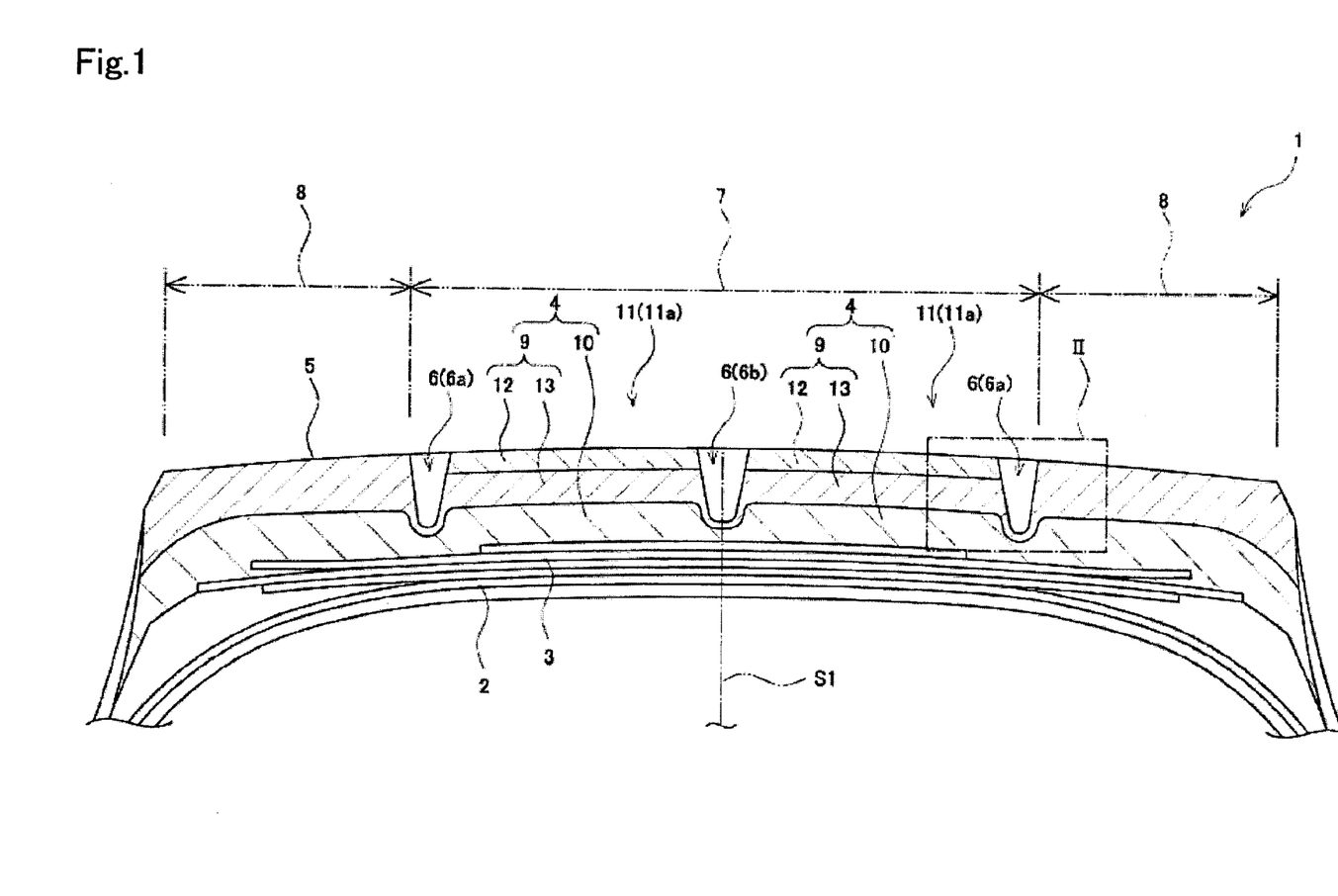
FIG. 1 shows a tire meridian cross sectional view of a tread portion of a pneumatic tire according to an embodiment of the present invention.
Figure 2:
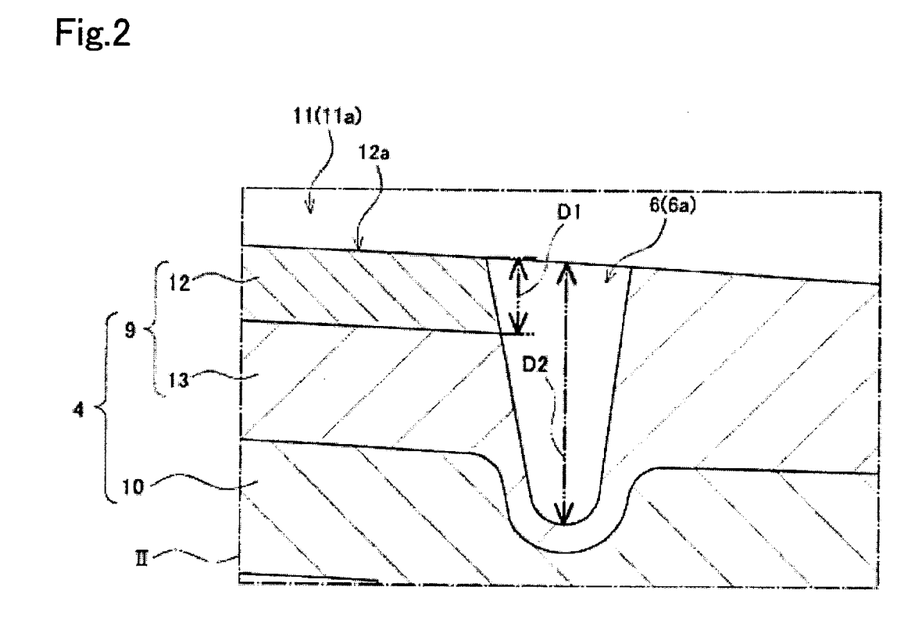
FIG. 2 shows an enlarged view in an area II in FIG. 1 of the pneumatic tire according to the embodiment

The pneumatic tire (hereinafter, simply refer also to as "tire") according to the present embodiment is provided with a tread portion 1 which is arranged in an outer peripheral portion, as shown in FIGS. 1 and 2. The tread portion 1 is provided with a carcass layer 2 which is constructed by a ply, a belt layer 3 which is arranged in an outer periphery of the carcass layer 2 and reinforces the carcass layer 2, and a tread rubber 4 which is arranged in an outer periphery of the belt layer 3. The tire according to the present embodiment is formed as a structure (a tread pattern, a cross sectional shape and a rubber material) which is symmetrical about a tire equatorial plane S1 which is a virtual surface passing through a center in a tire width direction.

The tread rubber 4 is provided with a tread surface 5 which is an outer peripheral surface, and a plurality of (three in the present embodiment) main grooves 6 which extend along a tire peripheral direction. In the following description, in the case that a plurality of main grooves 6 are distinguished, a pair of outer main grooves 6 and 6 arranged in the outermost side in a tire width direction are called as shoulder main grooves (outer main grooves) 6a and 6a, and the main groove 6 arranged between a pair of shoulder main grooves 6a and 6a is called as a center main groove 6b.

The tread rubber 4 is provided with a center area 7 which is arranged between outer edges of a pair of shoulder main grooves 6a and 6a, and a pair of shoulder areas 8 and 8 which are arranged in outer sides in the tire width direction of the respective shoulder main grooves 6a. The tread rubber 4 is provided with a cap portion 9 which constructs an outer layer so as to include the main groove 6, and a base portion 10 which is laminated in an inner periphery of the cap portion 9 and constructs an inner layer.

The main groove 6 is arranged in parallel to the tire peripheral direction, and is formed as a linear shape. The main groove 6 is constructed by a so-called straight main groove. The main groove 6 is provided with a so-called tread wear indicator (not shown) corresponding to a portion which is made partially shallower and is exposed according to the wear so that a wear degree can be known. The center main groove 6b is positioned on a tire equatorial plan S1.

The center area 7 is provided with a plurality of land portions 11 which are zoned by the main groove 6. Among a plurality of land portions 11, the land portion 11 positioned in the center portion in the tire width direction is called as a center land portion 11a. In the case that the main groove 6 is positioned on the tire equatorial plane S1 like the present embodiment, the center land portions 11a and 11a are the land portions which are arranged in both sides in the tire width direction of the main groove 6 positioned on the tire equatorial plane S1. In the case that the land portion 11 is positioned on the tire equatorial plane S1, the center land portion 11a is the land portion which is positioned on the tire equatorial surface S1.

The cap portion 9 in the center land portion 11a is provided with a cap front layer 12 which includes the tread surface 5 corresponding to the surface, and a cap inner layer 13 which is laminated in an inner periphery of the cap front layer 12. In the present embodiment, the cap front layer 12 is constructed by a surface portion 12a which is arranged along the tread surface 5 of the cap portion 9.

A thickness D1 of the surface portion 12a is set to be equal to or less than 45% a depth D2 of the main groove 6. The thickness D1 of the surface portion 12a is preferably set to be less than one third the depth D2 of the main groove 6. The thickness D1 of the surface portion 12a is more preferably set to be equal to or less than 30% the depth D2 of the main groove 6. The thickness D1 of the surface portion 12a is further preferably set to be equal to or more than 15% the depth D2 of the main groove 6. In the present embodiment, the thickness D1 of the surface portion 12a is set to be 30% the depth D2 of the main groove 6.

In the present embodiment, the cap portion 9 in the shoulder area 8 is constructed as a single layer. The cap portion 9 in the shoulder area 8 is integrally constructed by the same rubber material as the cap inner layer 13 in the cap portion 9 of the center land portion 11a.

A loss tangent (tan δ) of the cap front layer 12 is set to be smaller than a loss tangent (tan δ) of the cap inner layer 13 and smaller than a loss tangent (tan δ) of the cap portion 9 in the shoulder area 8. Hereinafter, the loss tangent (tan δ) of the cap front layer 12 is called as a first loss tangent (tan δ1), and the loss tangent (tan δ) in cap inner layer 13 of the center land portion 11a and the cap portion 9 in the shoulder area 8 which are integrally constructed is called as a second loss tangent (tan δ2).

The first loss tangent (tan δ1) is preferably set to be between 45% and 65% of the second loss tangent (tan δ2). In the present embodiment, the first loss tangent (tan δ1) is 0.04, the second loss tangent (tan δ2) is 0.07, and the first loss tangent (tan δ1) is 57% of the second loss tangent (tan δ2). Each of the loss tangents (tan δ1 and tan δ2) was measured in a state in which an inertial strain is 15%, a dynamic strain is ±2.5%, a frequency is 10 Hz and a temperature is 60° C., by using a spectrometer manufactured by UBM Co., Ltd.

As mentioned above, on the basis of the pneumatic tire according to the present embodiment, the loss tangent of the cap front layer 12 is set to be smaller than the loss tangent of the cap inner layer 13, and is set to be smaller than the loss tangent of the cap portion 9 in the shoulder area 8. As a result, since the rubber having the smaller loss tangent is arranged in the cap front layer 12 which is the portion having the larger energy loss, the rolling resistance can be reduced.

Further, since the rubber having the larger loss tangent is arranged in each of the cap inner layer 13 which is laminated in the inner periphery of the cap front layer 12, and the cap portion 9 which includes the surface of the shoulder area 8 affecting the wear resistance, the wear resistance is maintained. As mentioned above, on the basis of the pneumatic tire according to the present embodiment, it is possible to reduce the rolling resistance while maintaining the wear resistance.

Further, on the basis of the pneumatic tire according to the present embodiment, the cap front layer 12 is constructed by the surface portion 12a which is arranged along the surface of the cap portion 9, and the thickness D1 of the surface portion 12a is set to be 30% the depth D2 of the main groove 6, that is, be less than one third. As a result, since the cap inner layer 13 having the larger loss tangent supports the cap front layer 12, it is possible to further securely maintain the wear resistance.

The pneumatic tire according to the present invention is not limited to the structure according to the embodiment mentioned above, and is not limited to the operations and the effects mentioned above. It goes without saying that the pneumatic tire according to the present invention can be variously changed within the range which does not deflect from the scope of the present invention. For example, it goes without saying that structures and methods according to the following various modified examples can be optionally selected and be employed in the structures and the methods according to the embodiment mentioned above.

Figure 4:
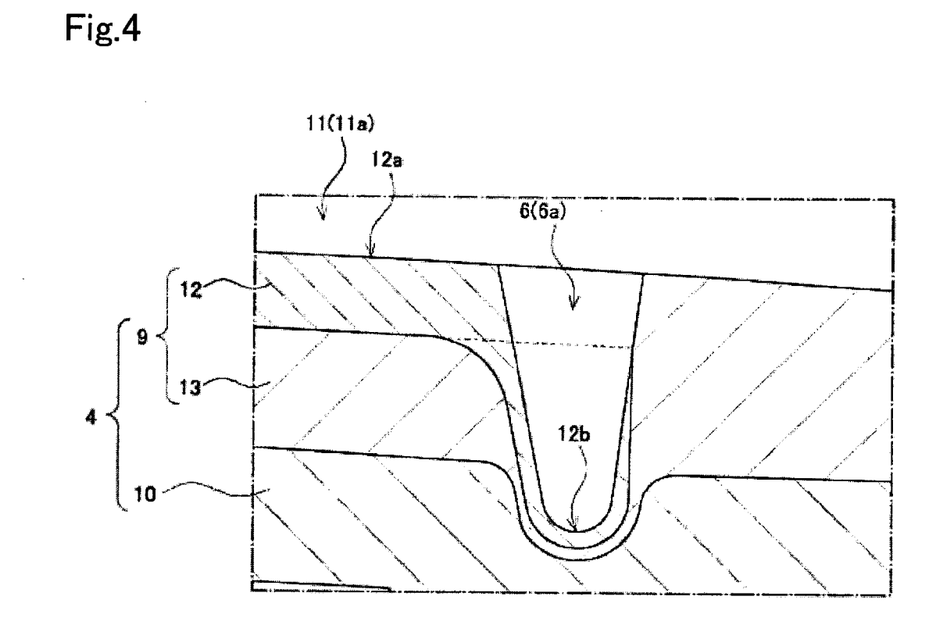
FIG. 4 shows a tire meridian enlarged cross sectional view of a tread portion of a pneumatic tire according to further the other embodiment of the present invention.
Figure 5:
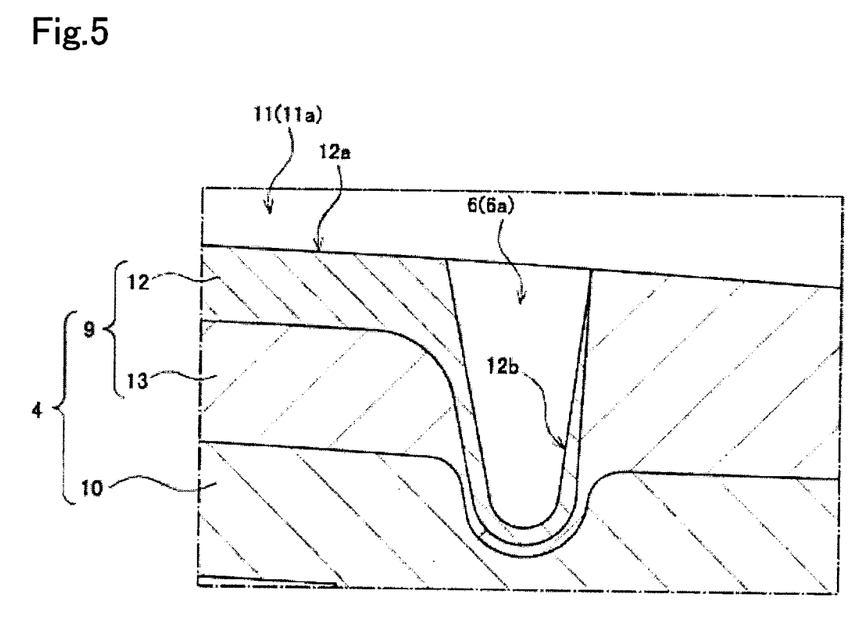
FIG. 5 shows a tire meridian enlarged cross sectional view of a tread portion of a pneumatic tire according to further the other embodiment of the present invention.

In the pneumatic tire according to the present embodiment, the cap front layer 12 is constructed only by the surface portion 12a which is arranged along the surface of the cap portion 9. However, the pneumatic tire according to the present invention is not limited to the structure mentioned above. For example, in the pneumatic tire according to the present invention, the cap front layer 12 may be structured such as to be provided with a surface portion 12a which is arranged along the surface of the cap portion 9, and a groove wall portion 12b which is arranged so as to extend along the wall portion of the main groove 6 from the surface portion 12a, as shown in FIGS. 3 to 5.

According to the structure mentioned above, since the surface portion 12a of the cap front layer 12 is arranged along the surface of the cap portion 9, the rubber having the smaller loss tangent is arranged in the portion having the larger energy loss. Further, since the groove wall portion 12b of the cap front layer 12 is arranged so as to extend along the wall portion of the main groove 6 from the surface portion 12a, the rubber having the smaller loss tangent is arranged in the other deforming portion than the surface. As a result, it is possible to further reduce the rolling resistance.

Figure 3:
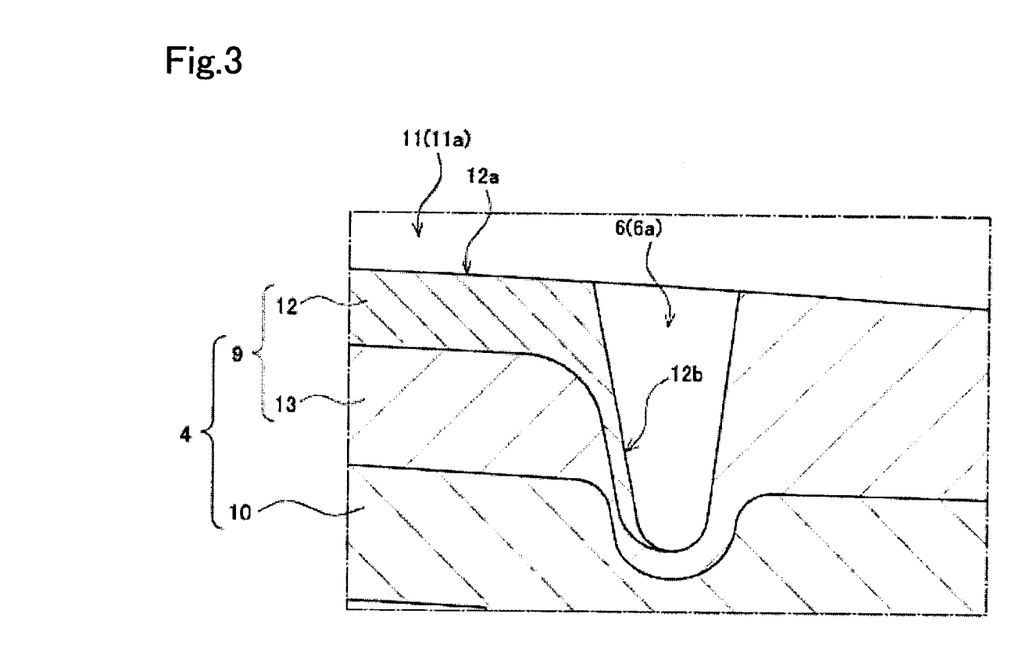
FIG. 3 shows a tire meridian enlarged cross sectional view of a tread portion of a pneumatic tire according to the other embodiment of the present invention.

The groove wall portion 12b according to FIG. 3 is arranged so as to extend to a bottom portion of the main groove 6 along an inner wall portion of the main groove 6 from an inner edge of the main groove 6 (an outer end portion of the surface portion 12a). The groove wall portion 12b according to FIG. 4 is arranged so as to extend to the bottom portion of the main groove 6 along the inner wall portion of the main groove 6 from the inner edge of the main groove 6, and further extend to a position of an inner peripheral surface in a tire diametrical direction of the surface portion 12a along an outer wall portion of the main groove 6 from the bottom portion of the main groove 6. The groove portion 12b according to FIG. 5 is arranged so as to extend to the bottom portion of the main groove 6 along the inner wall portion of the main groove 6 from the inner edge of the main groove 6, and further extend to an outer edge of the main groove 6 along the outer wall portion of the main groove 6 from the bottom portion of the main groove 6.

The pneumatic tire according to the embodiment mentioned above is structured such that three main grooves 6 are provided. However, the pneumatic tire according to the present invention is not limited to the structure mentioned above. For example, the pneumatic tire according to the present invention may be structured such that two main grooves 6 are provided, may be structured, as shown in FIGS. 6 and 7, such that four main grooves may be provided, or may be structures such that five or more main grooves may be provided.

Figure 6:
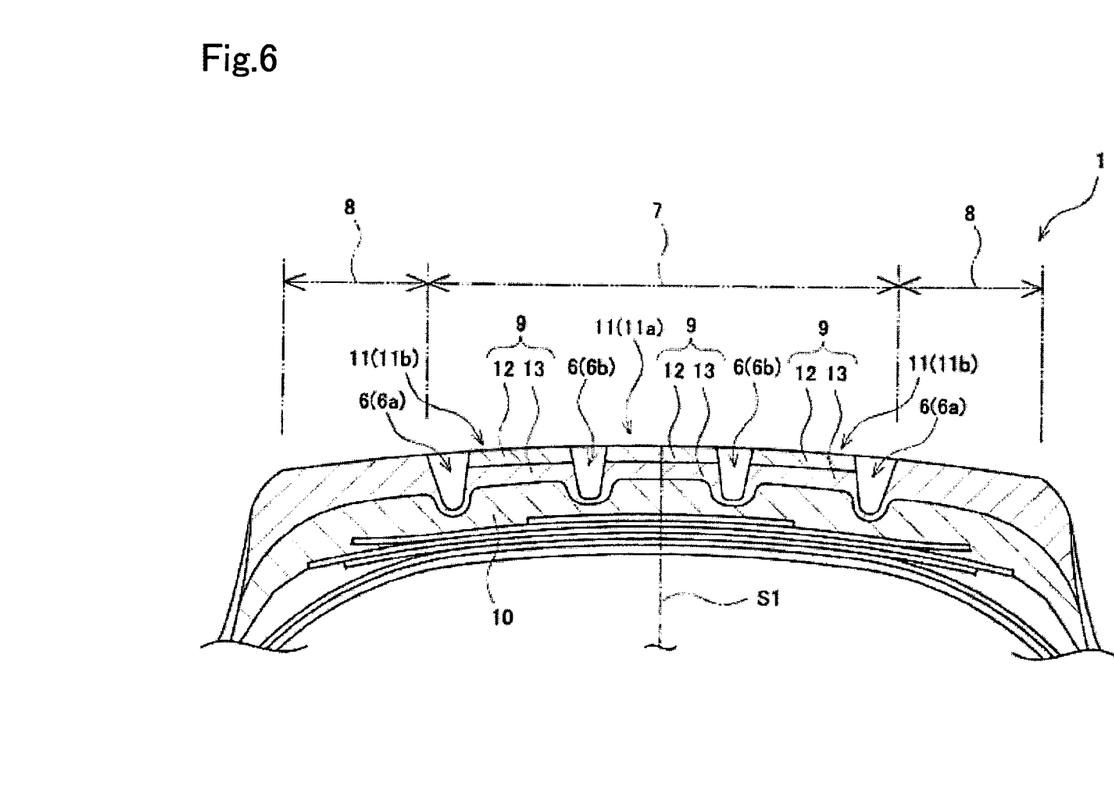
FIG. 6 shows a tire meridian enlarged cross sectional view of a tread portion of a pneumatic tire according to further the other embodiment of the present invention.
Figure 7:
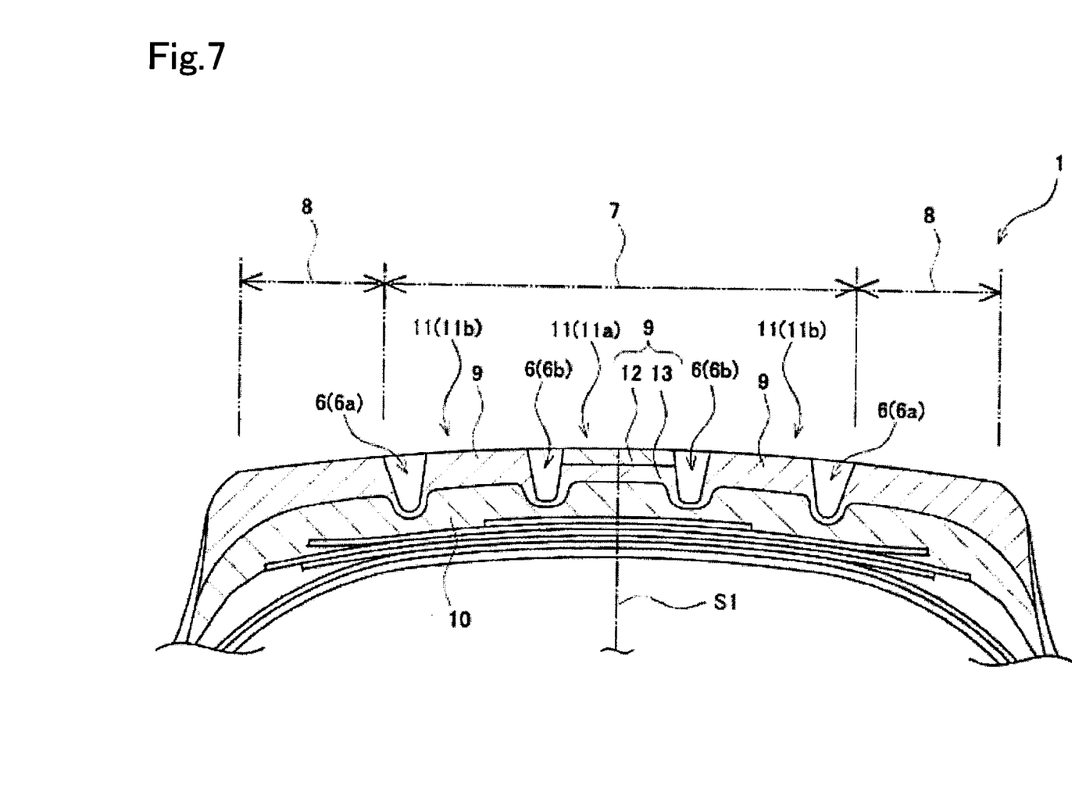
FIG. 7 shows a tire meridian enlarged cross sectional view of a tread portion of a pneumatic tire according to further the other embodiment of the present invention.
Figure 8:
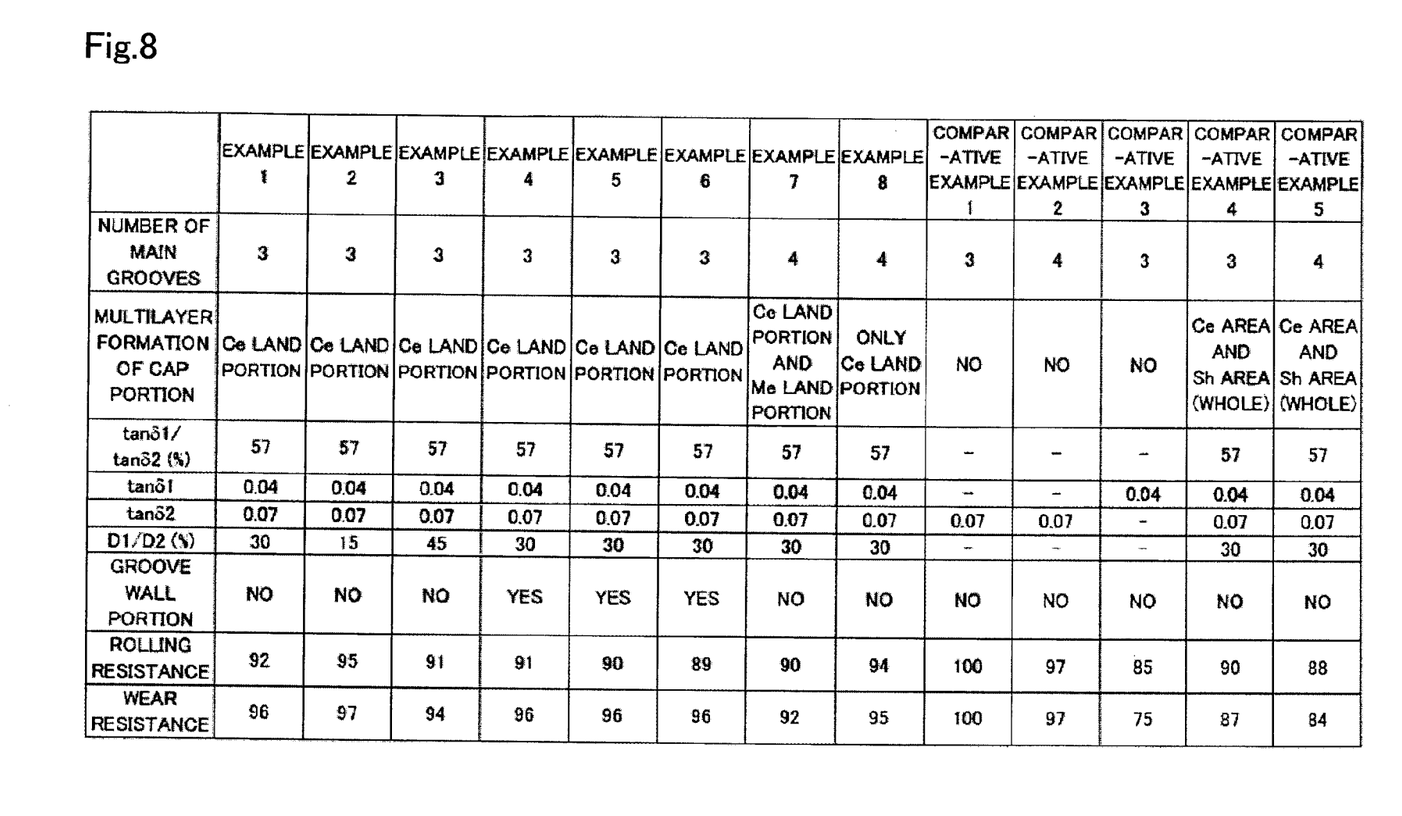
FIG. 8 shows evaluation of examples according to the present invention and comparative examples.

A pneumatic tire according to FIGS. 6 and 7 is provided with a pair of shoulder main grooves (outer main grooves) 6a and 6a which are arranged in an outermost side in the tire width direction, and a pair of center main grooves 6b and 6b which are arranged between a pair of shoulder main grooves 6a and 6a. A center area 7 is provided with a center land portion 11a which is zoned by the main grooved 6 so as to be positioned on the tire equatorial plane S1, and a pair of mediate land portions 11b and 11b which are arranged in both sides in the tire width direction of the center land portion 11a.

The pneumatic tire according to the embodiment is structured such that all the cap portions 9 of the land portions 11 are multilayered by the cap front layer 12 and the cap inner layer 13, among the cap portions 9 in the center area 7. However, the pneumatic tire according to the present invention is not limited to the structure mentioned above. Basically, the pneumatic tire according to the present invention may be structured variously as long as at least the cap portion 9 of the center land portion 11a is multilayered by the cap front layer 12 and the cap inner layer 13, among the cap portions 9 in the center area 7.

For example, the pneumatic tire may be structured, as shown in FIG. 7, such that only the cap portion 9 in the center land portion 11a is multilayered by the cap front layer 12 and the cap inner layer 13, among the cap portions 9 in the center area 7. In the structure mentioned above, the cap portion 9 in the mediate land portion 11b is constructed by a single layer, and is integrally formed by the same rubber material as the cap inner layer 13 in the center land portion 11a.

The pneumatic tire according to the embodiment is structured such that the cap inner layer 13 is constructed by the single layer. However, the pneumatic tire according to the present invention is not limited to the structure mentioned above. For example, the pneumatic tire according to the present invention may be structured such that the cap inner layer 13 is constructed by two or more layers.

The pneumatic tire according to the embodiment mentioned above is structured such that the cap portion 9 in the shoulder area 8 is constructed by the single layer. However, the pneumatic tire according to the present invention is not limited to the structure mentioned above. For example, the pneumatic tire according to the present invention may be structured such that the cap portion 9 in the shoulder area 8 is constructed by two or more layers. In the case of the structure mentioned above, the loss tangent of the cap front layer 12 is set to be smaller than the loss tangent of the layer which includes the surface of the cap portion 9 in the shoulder area 8.

The pneumatic tire according to the embodiment mentioned above is structured such that the constructions of the tread pattern, the cross sectional shape, and the arrangements of the rubber material and the multilayer portion are symmetrical about the tire equatorial plane S1. However, the pneumatic tire according to the present invention is not limited to the structure mentioned above. For example, the pneumatic tire according to the present invention may be structured such that at least one of the tread pattern, the cross sectional shape and the arrangements of the rubber material and the multilayer portion is asymmetrical about the tire equatorial plane S1.

The pneumatic tire according to the embodiment mentioned above is structured such that the main groove 6 is formed as the linear shape. However, the pneumatic tire according to the present invention is not limited to the structure mentioned above. For example, the pneumatic tire according to the present invention may be structured such that the main groove 6 is formed as a zigzag shape, or may be structured such that the main groove 6 is formed as a wavy shape.

In the pneumatic tire according to the present invention, the wear resistance can be improved by changing the positions of the shoulder main grooves (the outer main grooves) 6a and 6a. For example, a rubber volume in the center area 7 is enlarged as the shoulder main groove 6a is positioned toward the outer side in the tire width direction. As a result, the wear resistance in the center area 7 is improved.

EXAMPLES

In order to specifically indicate the structures and the effects of the present invention, a description will be given below of examples of the pneumatic tire according to the present invention and comparative examples of the same.
<Rolling Resistance>
After assembling each of tires having size 275/80R22.5 in a rim, a rolling resistance was measured according to International Standards ISO28580 (JIS D4234). Results are evaluated by an index number in which a result of a comparative example 1 is set to 100, and the smaller the index number is, the lower the rolling resistance is, that is, the more excellent the rolling resistance is.
<Wear Resistance>
After installing each of the tires having the size 275/80R22.5 to a vehicle and traveling on a general road for 30,000 km, an amount of wear (a reducing amount of the main groove depth) of each of the main grooves was measured, and a value obtained by subtracting an average value of the amounts of wear from a depth of a brand-new main groove was calculated. Evaluation is shown by an index number in which the comparative example 1 is set to 100, and the larger the numerical value is, the more excellent the wear resistance is. In the case that the wear resistance is equal to or more than 90, it can be said that the wear resistance is maintained. On the other hand, in the case that the wear resistance is less than 90, it can be said that the wear resistance is not maintained.

Examples 1 to 8

An example 1 is the tire according to the embodiment mentioned above.

An example 2 is a tire in which a ratio of the thickness D1 of the surface portion 12a of the cap front layer 12 in relation to the depth D2 of the main groove is changed to 15%, in comparison with the example 1.

An example 3 is a tire in which the ratio of the thickness D1 of the surface portion 12a of the cap front layer 12 in relation to the depth D2 of the main groove is changed to 45%, in comparison with the example 1.

An example 4 is a tire which is changed so as to be provided with the groove wall portion 12b extending to the bottom portion of the main groove 6 from the inner edge of the main groove 6, as shown in FIG. 3, in comparison with the example 1.

An example 5 is a tire which is changed so as to be provided with the groove wall portion 12b extending to the position of the inner peripheral surface in the tire diametrical direction of the surface portion 12a from the inner edge of the main groove 6 via the bottom portion of the main groove 6, as shown in FIG. 4, in comparison with the example 1.

An example 6 is a tire which is changed so as to be provided with the groove wall portion 12b extending to the outer edge of the main groove 6 from the inner edge of the main groove 6 via the bottom portion of the main groove 6, as shown in FIG. 5, in comparison with the example 1.

An example 7 is a tire in which the number of the main grooves 6 is changed to four, and the cap portions 9 of all the land portions 11 in the center area 7 are multilayered by the cap front layer 12 (having tan δ1 corresponding to the smaller loss tangent) and the cap inner layer 13 (having tan δ2 corresponding to the larger loss tangent), as shown in FIG. 6, in comparison with the example 1.

An example 8 is a tire in which the number of the main grooves 6 is changed to four, and the cap portion 9 only of the center land portion 11a in the center area 7 is multilayered by the cap front layer 12 (having tan δ1 corresponding to the smaller loss tangent) and the cap inner layer 13 (having tan δ2 corresponding to the larger loss tangent), as shown in FIG. 7, in comparison with the example 1.

Comparative Examples 1 to 5

A comparative example 1 is a tire in which the number of the main grooves 6 is set to three, and all the cap portions 9 are set to the rubber having the larger loss tangent (tan δ2).

A comparative example 2 is a tire in which the number of the main grooves 6 is set to four, and all the cap portions 9 are set to the rubber having the larger loss tangent (tan δ2).

A comparative example 3 is a tire in which the number of the main grooves 6 is set to three, and all the cap portions 9 are set to the rubber having the smaller loss tangent (tan δ1).

A comparative example 4 is a tire in which the number of the main grooves 6 is set to three, and all the cap portions 9 (not only the cap portion 9 in the center area 7 but also the cap portions 9 in the shoulder area 8) are multilayered by the cap front layer 12 (having tan δ1 corresponding to the smaller loss tangent) and the cap inner layer 13 (having tan δ2 corresponding to the larger loss tangent).

A comparative example 5 is a tire in which the number of the main grooves 6 is set to four, and all the cap portions 9 (not only the cap portions 9 in the center area 7 but also the cap portions 9 in the shoulder area 8) are multilayered by the cap front layer 12 (having tan δ1 corresponding to the smaller loss tangent) and the cap inner layer 13 (having tan δ2 corresponding to the larger loss tangent).
<Results of Evaluation>
In the comparative examples 1 and 2, since a whole of the cap portion 9 is constructed by the rubber having the larger loss tangent (tan δ2), the rolling resistance can not be sufficiently reduced. In the comparative example 3, a whole of the cap portion 9 is constructed by the rubber having the smaller loss tangent (tan δ1), the wear resistance is inferior. In the comparative examples 4 and 5, since the layer including the surface of the shoulder area 8 is constructed by the rubber having the smaller loss tangent (tan δ1), the wear resistance is inferior. On the contrary, in the examples 1 to 7, the rolling resistance can be reduced while maintaining the wear resistance, and a reducing rate (an improving rate) of the rolling resistance is greater than a lowering rate (a deteriorating rate) of the wear resistance.

What is claimed is:
1. A pneumatic tire comprising:
a tread rubber; and
a plurality of main grooves extending along a tire peripheral direction and provided in the tread rubber,
wherein the tread rubber has a center area which is arranged between a pair of outer main grooves arranged in an outermost side in a tire width direction, and a pair of shoulder areas which are arranged in outer sides in the tire width direction of the outer main grooves,
wherein the center area has at least one center land portion which is zoned by the main grooves and is positioned in a center portion in the tire width direction, wherein the tread rubber has a cap portion which constructs an outer layer, and a base portion which is laminated in an inner periphery of the cap portion and constructs an inner layer, wherein at least the cap portion of at least one center land portion among the cap portion in the center area has a cap front layer which includes a surface, and a cap inner layer which is laminated in an inner periphery of the cap front layer, the cap front layer has a surface portion which is arranged along the surface of the cap portion, wherein each cap portion of the pair of shoulder areas is constructed as a single layer, wherein the cap front layer further comprises a groove wall portion which is arranged so as to extend along a wall portion of the main grooves from the surface portion, the groove wall portion is arranged so as to extend to a bottom portion of the main grooves from an inner edge of the main grooves, and further, extend at least to a position of an inner peripheral surface in the tire diametrical direction of the surface portion along an outer wall portion of the main grooves from the bottom portion of the main grooves, and so as not to extend to an outer edge of the main grooves, wherein a loss tangent of the cap front layer is set to be smaller than a loss tangent of the cap inner layer and be smaller than a loss tangent of the cap portions in the shoulder areas, and wherein a thickness of the surface portion is set to be less than one third a depth of the main grooves wherein the center area having at least one center land portion positioned in the center portion in the tire width direction further comprises a first mediate land portion and a second mediate land portion which are arranged on either side of the at least one center land portion in the tire width direction, and wherein the cap portion in the at least one center land portion is constructed by a multilayer comprising the cap front layer and the cap inner layer, and the cap portion in the first mediate land portion and the second mediate land portion is constructed by a single layer.

2. The pneumatic tire according to claim 1, wherein each cap portion of the pair of shoulder areas is constructed by a same rubber material as the cap inner layer in the cap portion of the at least one center land portion.

3. The pneumatic tire according to claim 1, wherein the cap portion in the first mediate land portion and the second mediate land portion is constructed by a same rubber material as the cap inner layer in the at least one center land portion.

4. The pneumatic tire according to claim 1, further comprising a carcass layer constructed by a ply and a belt layer arranged in an outer periphery of the carcass layer.

5. The pneumatic tire according to claim 1, wherein the thickness of the surface portion is set to be equal to or less than 15% the depth of the main grooves.

* * * * *